(12) United States Patent
Ikebukuro

(10) Patent No.: US 10,349,644 B2
(45) Date of Patent: Jul. 16, 2019

(54) HANDLE KNOB FOR A FISHING REEL

(71) Applicant: Shimano Inc., Sakai, Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/156,432

(22) Filed: Oct. 10, 2018

(65) Prior Publication Data

US 2019/0141970 A1    May 16, 2019

(30) Foreign Application Priority Data

Nov. 13, 2017 (JP) ................. 2017-218155

(51) Int. Cl.
*A01K 89/01* (2006.01)
*A01K 89/00* (2006.01)

(52) U.S. Cl.
CPC ................. *A01K 89/006* (2013.01)

(58) Field of Classification Search
CPC ............ A01K 89/006; A01K 89/0183
USPC ......................... 74/545, 543, 557
See application file for complete search history.

(56) References Cited

U.S. PATENT DOCUMENTS

| | | | | |
|---|---|---|---|---|
| 2,981,495 A * | 4/1961 | King | ................. | A01K 89/006 242/265 |
| 4,674,355 A * | 6/1987 | Klein | ................. | G05G 1/085 384/543 |
| 4,830,306 A * | 5/1989 | Tsunoda | ................. | A01K 89/01 242/316 |
| 4,991,461 A * | 2/1991 | Sennett | ................. | G05G 1/06 74/553 |
| 5,150,853 A * | 9/1992 | Bernard | ................. | A01K 89/006 242/283 |
| 5,284,400 A * | 2/1994 | Thomas | ................. | B60K 20/02 403/243 |
| 5,328,122 A * | 7/1994 | Yamaguchi | ................. | A01K 89/006 242/283 |
| 5,328,128 A * | 7/1994 | Morris | ................. | A01K 89/006 242/283 |
| 5,577,678 A * | 11/1996 | Murayama | ................. | A01K 89/006 242/283 |
| 5,875,986 A * | 3/1999 | Miyazaki | ................. | A01K 89/0155 242/261 |
| 5,934,587 A * | 8/1999 | Yamaguchi | ................. | A01K 89/006 242/283 |

(Continued)

FOREIGN PATENT DOCUMENTS

JP        10-98991 A      4/1998

*Primary Examiner* — Emmanuel M Marcelo
(74) *Attorney, Agent, or Firm* — Global IP Counselors, LLP

(57) ABSTRACT

A handle knob for a fishing reel is mounted on a knob shaft to be rotatable about an axis of the knob shaft, and is fixed to an operation body rotatably combined with a reel body. The handle knob includes an inner knob, an outer knob integrally formed therewith, and bearings having an inner ring fitted to the outer surface of the knob shaft and an outer ring fitted to the inner surface of the inner knob, and that rotatably support the inner knob on the knob shaft about the axis. The inner knob includes a bearing surface with which the outer ring contacts, and the bearing surface including a through-hole having an opening in the bearing surface while penetrating the inner knob in a radial direction and through which an insertion portion of the outer knob is inserted.

7 Claims, 10 Drawing Sheets

(56) References Cited

U.S. PATENT DOCUMENTS

| | | | | |
|---|---|---|---|---|
| 5,971,309 | A * | 10/1999 | Yamaguchi | A01K 89/006 242/283 |
| 7,168,647 | B1 * | 1/2007 | Kang | A01K 89/033 242/303 |
| 2006/0071107 | A1 * | 4/2006 | Ochiai | A01K 89/006 242/283 |
| 2006/0283999 | A1 * | 12/2006 | Savakis | A01K 89/006 242/283 |
| 2011/0073696 | A1 * | 3/2011 | Niitsuma | A01K 89/006 242/283 |
| 2015/0060587 | A1 * | 3/2015 | Kurihara | A01K 89/006 242/395 |
| 2016/0157473 | A1 * | 6/2016 | Header | A01K 89/006 |

* cited by examiner

HANDLE KNOB FOR A FISHING REEL

CROSS-REFERENCE TO RELATED APPLICATIONS

This application claims priority to Japanese Patent Application No. 2017-218155, filed on Nov. 13, 2017. The entire disclosure of Japanese Patent Application No. 2017-218155 is hereby incorporated herein by reference.

BACKGROUND

Field of the Invention

The present invention relates to a handle knob for a fishing reel and a fishing reel having such a handle knob.

Background Art

Fishing reels, such as spinning reels and dual-bearing reels, generally comprise a handle assembly for winding a fishing line. Typically, the handle assembly comprises a handle arm that is non-rotatably mounted on a handle shaft, a knob shaft that is non-rotatably connected to the distal end of the handle arm, and a tubular handle knob (grip portion) that is rotatably mounted on the knob shaft.

The handle knob is rotatably mounted on the knob shaft via shaft bearings, such as ball bearings. The bearings are disposed, for example, at intervals along the axial direction of the knob shaft; the inner rings of the bearings are fitted to the outer surface of the knob shaft, and the outer rings of the bearings are fitted to the inner surface of the handle knob. Of the bearings, the bearing that is disposed on the distal end side of the knob shaft is retained by a fixing screw that is attached to the distal end surface of the knob shaft from the axial direction. Thus, the entire handle knob is rotatably mounted on the knob shaft via bearings in a state of retention.

Various types of such handle knobs are known; for example, Japanese Published Unexamined Application No. Hei 10(1998)-98991 discloses a handle knob composed of a body member formed in a tubular shape using a cork material, and an exterior part (protective covering) that covers the outer surface of the body member with synthetic resin, rubber, or the like.

Furthermore, another known handle knob is formed using, for example, an insert molding, in which molten resin is injected into a molding die in which a pre-molded insert component has been set, and the molten resin is cured to form an exterior part, thereby integrating the insert component and the exterior part.

There are many cases in which a handle knob is required to have a fitting property so that there is no slippage when wet, or a gripping property that allows secure gripping, and thus the materials and shapes of such handle knobs continue to improve day by day. In such circumstances, when employing a design that emphasizes, for example, the ability of the handle knob to be easily gripped or reduced further in weight, the shape of the handle knob tends to be complex due to the influence of such design considerations, and the molding precision of the handle knob also tends to deteriorate as the shape becomes more complex.

However, with regard to such a conventional handle knob, when the shapes of the body member and the insert component are complex, or when the molding precision deteriorates, there is risk of, for example, the formation of a gap between the members and the exterior part, which in turn may generate positional displacement or rattling of the exterior part with respect to the body member and the insert component. In this configuration, for example, deterioration of the fitting and gripping properties, and the rattling of the handle knob itself, tend to occur, which leads to deterioration of the handle operability.

SUMMARY

The present invention was conceived in light of such circumstances, and an object thereof is to provide a handle knob for a fishing reel that can be mounted on a knob shaft with little rattling while suppressing the deterioration of the fitting and gripping properties and providing stable handle operability, as well as a fishing reel.

One aspect of the present invention is to provide a handle knob for a fishing reel that is mounted on a knob shaft to be rotatable about an axis of the knob shaft that is fixed to an operation body rotatably combined with the reel body of a fishing reel, and comprises an inner knob, which is formed in a tubular shape that surrounds the knob shaft from the radially outward side; an outer knob, which is made of resin formed so as to further surround at least a portion of the inner knob from the radially outward side and which is integrally formed with the inner knob; and a bearing that have an inner ring fitted on the outer surface of the knob shaft, and an outer ring fitted to the inner surface of the inner knob, and that rotatably support the inner knob with respect to the knob shaft around the axis, wherein a bearing surface contacts the outer ring and the bearing surface has a through-hole which opens in the radial direction of the axle and a insertion portion the outer knob is inserted into the through-hole.

By the handle knob of the present invention, it is possible to form the outer knob integrally with the inner knob by, for example, insert molding, in which the inner knob is used as an insert component, so that it is possible to form the outer knob into a desired shape, and to respond to various requirements, such as weight reduction and improved gripping performance. In particular, a through-hole, which opens onto the bearing surface, is formed in the inner knob, and an insertion portion of the outer knob is inserted into the through-hole, so that it is possible to incorporate the bearing to suppress positional displacement, rattling, etc., with respect to the handle knob, without influence from the molding precision and the shape of the handle knob. Therefore, it is possible to provide a handle knob in which the outer knob is integrally combined with the inner knob and to suppress deterioration of the fitting and gripping properties, so that the bearing is less susceptible to rattling, etc.

As a result, it is possible to mount the handle knob on the knob shaft by the bearing with little rattling, and to smoothly carry out handle operations of the fishing reel to contribute to improving handle operability. It should be noted that the part of the outer knob that is inserted into the through-hole is formed, for example, at the time of insert molding, when the molten resin that will become the outer knob enters the through-hole.

In another aspect of the present invention an insertion portion of the outer knob can protrude farther on the axis side than the bearing surface and pressed against the outer ring from the radially outward side.

In this embodiment, the insertion portion of the outer knob that is inserted into the through-hole presses against the outer ring from the radially outward side; therefore, for example, even when a slight rattling between the outer ring and the bearing surface of the inner knob occurs due to the molding precision or the shape of the inner knob, it is possible to carry out pressing so that the outer ring is pressed from the radially outward side. As a result, it is possible to attach bearings between the inner knob and the knob shaft so as to press-fit the outer ring onto the inner surface side of the inner knob, and to firmly fit the outer ring to the inner knob. Therefore, it is possible to reliably hold the bearings on the inner side of the inner knob without influence from the molding precision and the shape of the inner knob, etc. Thus, it is possible to suppress rattling between the inner knob and the bearings and to mount the handle knob on the knob shaft via the bearings with little or no rattling. As a result, it is possible to smoothly operate the handle the fishing reel, which contributes to improving handle operability.

In another aspect of the present invention, a plurality of the through-holes can be formed at intervals around the axis.

In this embodiment, it is possible to insert an insertion portion of the outer knob into a plurality of through-holes, so that the outer knob can be precisely combined with the inner knob to suppress positional displacement, rattling, etc.

In the embodiment in which an insertion portion of the outer knob presses against the outer ring from the radially outward side, since it is possible to press against a plurality of locations on the outer ring from the radially outward side, it is possible to stably hold the bearing to suppress rattling between the outer ring and the bearing.

In another aspect of the present invention, the through-holes can be arranged so as to oppose each other in the radial direction across the axis.

In this embodiment, the portions of the outer knob that are inserted into the through-holes are arranged to oppose each other in the radial direction, so that the weight balance of the entire handle knob is less susceptible to nonuniformity. Therefore, it is possible to operate the handle stably and smoothly.

In the embodiment in which portions of the outer knob press against the outer ring from the radially outward side, the bearing can be held securely since it is possible to sandwich the outer ring from the radially outward side. Furthermore, since the outer ring is less susceptible to positional displacement in the radial direction, it is possible to precisely arrange the center of the bearing on the axis, and operate the handle more smoothly.

In another aspect of the present invention, a guide surface, which is formed along the peripheral edge of the opening of the through-hole, and which gradually extends toward the through-hole side, from the outer surface side toward the inner surface side of the inner knob, can be formed on the outer surface of the inner knob.

In this embodiment, for example, when the outer knob is formed by insert molding, it is possible to actively introduce the molten resin into the through-hole using the guide surface. Therefore, it is possible to reliably insert an insertion portion of the outer knob into the through-hole without influence from, for example, the viscosity of the molten resin. Thus, a greater variety of resins can be used to form the outer knob, and to enhance the degree of freedom of design.

In another aspect of the present invention, the outer knob can be formed from an elastomer resin.

In this embodiment, it is possible to impart elasticity to the entire outer knob, so that the handle knob can include enhanced fitting and gripping properties.

Also, in embodiments in which an insertion portion of the outer knob presses against the outer ring from the radially outward side, it is possible to attach the outer ring with a portion thereof configured to deform elastically, so that it is possible, for example, to increase the amount of protrusion from the bearing surface toward the axis side. As a result, it is possible to secure a press-fitting margin (press-fitting margin) of the bearing by that amount, and to hold the bearing more stably.

In another aspect of the present invention, a fishing reel comprises the reel body, a handle shaft that is rotatably supported with respect to the reel body, and the handle knob for a fishing reel, wherein the operation body is a handle arm that is non-rotatably connected to the handle shaft and to the distal end of which the knob shaft is non-rotatably connected, the handle knob also being mounted on the distal end portion of the handle arm via the knob shaft.

According to the fishing reel of this embodiment of the present invention, since the handle knob described above is provided, it is possible to operate the handle smoothly with little or no rattling, and to smoothly wind the fishing line. Therefore, it is possible to provide a high-quality, high-performance reel with improved operability. In particular, it is possible to rotate the handle arm via the handle knob, so that it can be suitably used as a spinning reel or a dual-bearing reel.

Thus, the present invention provides a handle knob for a fishing reel that can be mounted on a knob shaft with little rattling while preventing deterioration of the fitting and gripping properties, and that can realize stable handle operability, as well as a fishing reel having such a handle knob.

DETAILED DESCRIPTION OF THE EMBODIMENTS

Embodiment 1

One embodiment of the handle knob and the fishing reel according to the present invention will be described below with reference to the drawings. In the present embodiment, a spinning reel is described as an example of a fishing reel. Additionally, in each of the drawings, there are cases in which the scale of each component member has been appropriately changed as necessary in order to make the component members visible in size.

Figure 1:
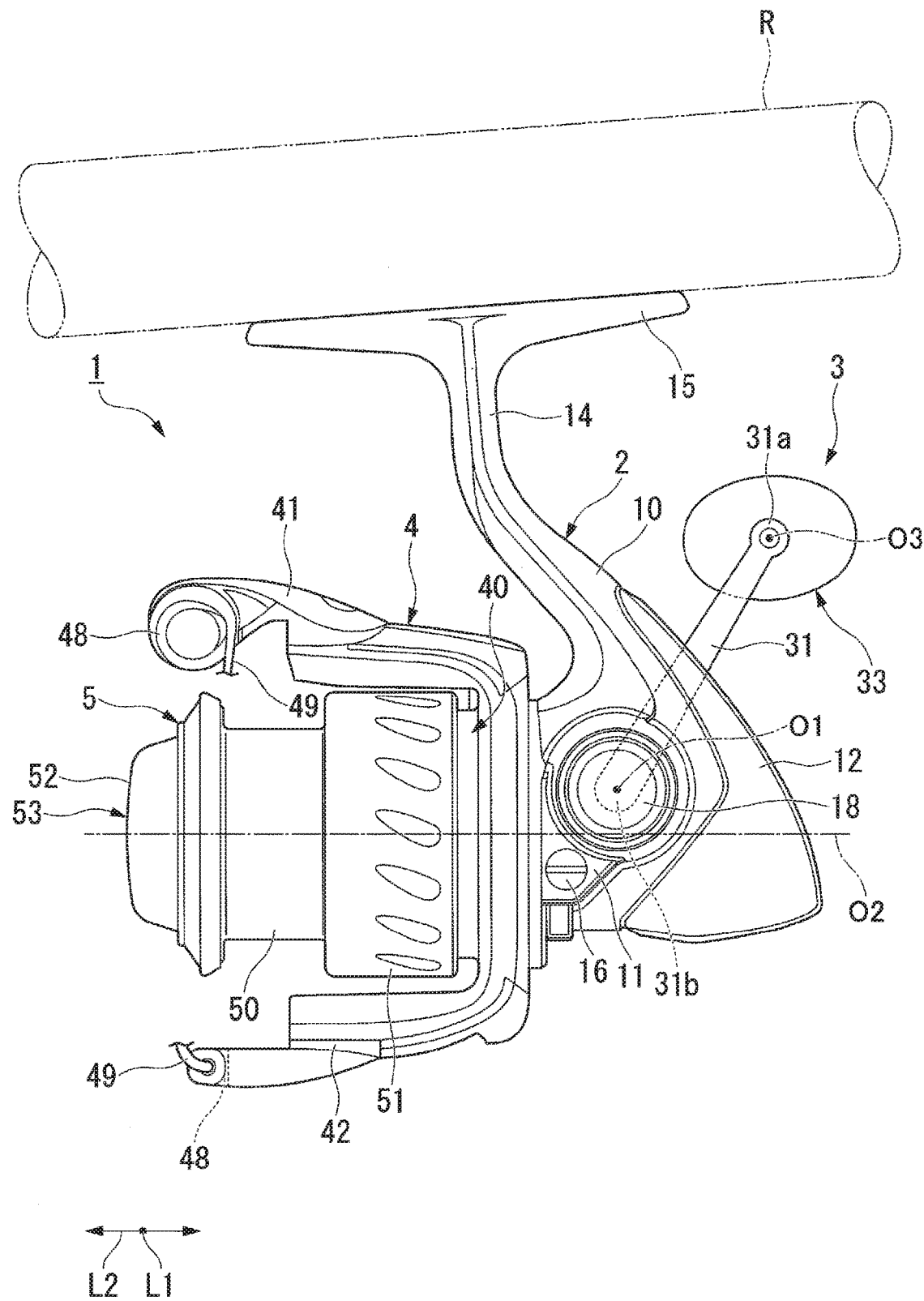
FIG. 1 is a side view of a spinning reel illustrating a first embodiment of the present invention.
Figure 2:
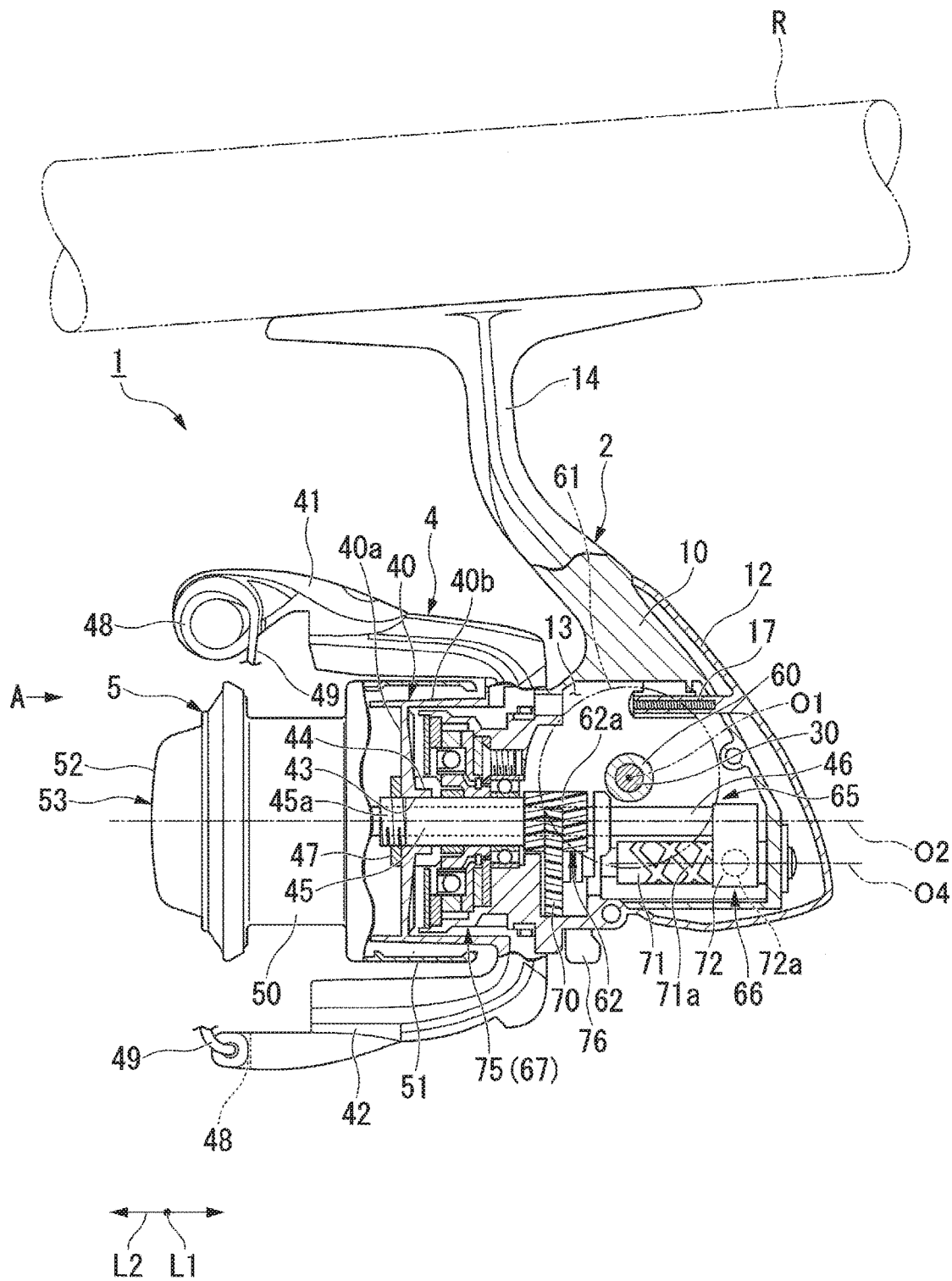
FIG. 2 is a side view that includes a partial cross-sectional view of the spinning reel shown in FIG. 1.
Figure 3:
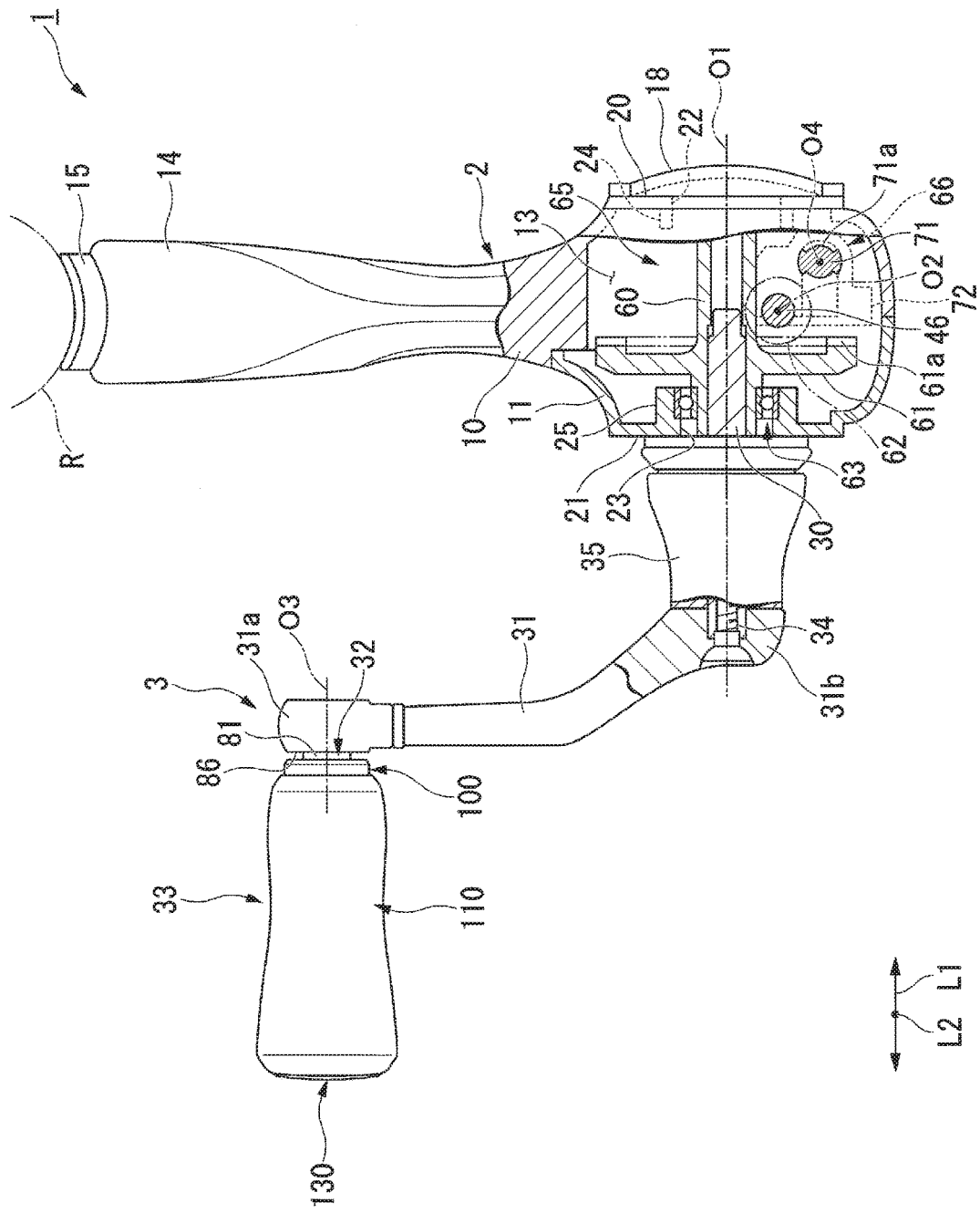
FIG. 3 is a front view that includes a partial cross-sectional view of the spinning reel when viewing the spinning reel shown in FIG. 2 from the arrow A direction (front side).

As shown in FIGS. 1-3, a spinning reel 1 of the present embodiment comprises a reel body 2, a handle assembly 3 rotatably mounted on the reel body 2 about a first axis O1, a rotor 4 rotatably combined with the reel body 2 about a second axis O2, and a spool 5 combined with the reel body 2 so as to be reciprocally movable along the second axis O2, and around which is wound a fishing line (not shown).

The first axis O1 and the second axis O2 intersect and are essentially orthogonal to each other. In the present embodiment, the direction along the first axis O1 is defined as the left-right direction L1, and the direction along the second axis O2 is defined as the front-rear direction L2. Additionally, the direction in which the fishing line is unreeled from the spool 5 (cast) in the front-rear direction L2 is defined as the front, the direction opposite thereto is defined as the rear, and the left and right are defined according to a front view (state shown in FIG. 3) of the spinning reel 1 as viewed from the front side.

Furthermore, the direction intersecting the first axis O1 according to a plan view of the first axis O1 as viewed from the axis direction thereof (left-right direction L1) can be referred to as the radial direction, and the direction encircling the first axis O1 can be referred to as the circumferential direction. Similarly, the direction intersecting the second axis O2 according to a plan view of the second axis O2 as viewed from the axis direction thereof (front-rear direction L2) can be referred to as the radial direction, and the direction encircling the second axis O2 can be referred to as the circumferential direction. Furthermore, in the direction radial to the first axis O1, the direction from the first axis O1 to the fishing rod R is referred to as upward, and the opposite direction is referred to as downward.

Reel Body

The reel body 2 comprises a body portion, a lid part 11, and a guard member 12. The body portion 10 is a molded part made from a light alloy such as a magnesium alloy or an aluminum alloy, and a housing space 13 for accommodating various constituent parts of the reel is formed therein. A leg portion 14 is integrally formed on the upper portion of the body portion 10 so as to extend upwardly. A mounting piece 15 to be mounted on the fishing rod R is formed at the upper end portion of the leg portion 14 so as to extend along the fishing rod R.

The fishing rod R shown in FIGS. 1 to 3 is illustrated schematically, and illustrations of configurations such as that of a reel attachment pedestal (reel seat), which are generally provided on a fishing rod R, have been omitted.

Like the body portion 10, the lid part 11 is a molded part made from a light alloy, and is detachably fixed to the body portion 10. The housing space 13 described above is closed by the lid part 11 so as to be, for example, tight (liquid-tight, airtight, etc.). The method for fixing the lid part 11 to the body portion 10 is not particularly limited, and is, for example, fixed by utilizing a plurality of fixing bolts, including a fixing bolt 16 that is disposed in a portion of the body portion 10 that is positioned on the rear side of the rotor 4.

The guard member 12 is a cover part that covers the rear portion of the body portion 10 and the rear portion of the lid part 11 from the rear side. However, the guard member 12 is not a necessary component and need not be provided. The guard member 12 is detachably fixed to the rear portion of the body portion 10 by a fixing bolt 17 that is inserted into the body portion 10 from the housing space 13 side toward the rear.

As shown in FIG. 3, a flat first mounting wall 20 for mounting the handle assembly 3 or a cap 18 is formed on the left-side surface of the body portion 10. A flat second mounting wall 21 for mounting the handle assembly 3 or the cap 18 is correspondingly formed on the right-side surface of the lid part 11. In the illustrated example, the cap 18 is mounted on the first mounting wall 20 side and the handle assembly 3 is mounted on the second mounting wall 21 side.

That is, the spinning reel 1 of the present embodiment is an example of a right-handled spinning reel. However, as described below, it is possible to switch to a left-handled spinning reel by mounting the handle assembly 3 on the first mounting wall 20 side. In this embodiment, the cap 18 is mounted on the second mounting wall 21 side.

A first mounting hole 22 is formed in the first mounting wall 20 and passes through the body portion 10 in the left-right direction L1. Similarly, a second mounting hole 23 is formed in the second mounting wall 21 and passes through the lid part 11 in the left-right direction L1. The first mounting hole 22 and the second mounting hole 23 are formed coaxially with the first axis O1 and are disposed facing each other in the left-right direction L1 across the housing space 13.

A cylindrically shaped first supporting cylinder 24 that protrudes toward the interior of the housing space 13, and the inner side of which communicates with the interior of the first mounting hole 22, is formed in the first mounting wall 20. Similarly, a cylindrically shaped second supporting cylinder 25 that protrudes toward the interior of the of housing space 13, and the inner side of which communicates with the inside of the second mounting hole 23, is formed on the second mounting wall 21. The first supporting cylinder 24 and the second supporting cylinder 25 are arranged coaxially with the first axis O1.

Handle Assembly

As shown in FIG. 3, the handle assembly 3 comprises a handle shaft 30 supported with respect to the reel body 2 so as to be rotatable about the first axis O1, a handle arm (operation body) 31 non-rotatably connected to the handle shaft 30 and mounted to be rotatable about the first axis O1 with respect to the reel body 2 via the handle shaft 30, a knob shaft 32 fixed to a distal end portion 31a of the handle arm 31, and a handle knob 33 rotatably mounted on the knob shaft 32.

The handle arm 31 is formed to extend radially from the first axis O1, and a proximal end portion 31b thereof is formed on the right side of the second mounting wall 21. The handle shaft 30 is integrally connected to the proximal end portion 31b of the handle arm 31 via, for example, a coupling screw 34, and is inserted into the interior of the reel body 2 from the right side through the second mounting hole 23 coaxially with the first axis O1. The handle shaft 30 is connected to a cylindrical drive shaft 60, which is described below, by insertion into the drive shaft 60. The handle shaft 30 is connected to the drive shaft 60 to be incapable of relative rotation about the first axis O1.

The handle assembly 3 is thereby mounted on the reel body 2 to be rotatable about the first axis O1, as described above. In addition, it is possible to rotate the drive shaft 60 about the first axis O1 via the handle shaft 30 by rotation of the handle assembly 3 about the first axis O1.

A handle collar 35 is disposed between the proximal end portion 31b of the handle arm 31 and the second mounting wall 21. The handle collar 35 is formed in a cylindrical shape that covers a portion of the handle shaft 30 positioned between the second mounting wall 21 and the proximal end portion 31b of the handle arm 31 from the radially outward side. The handle collar 35 is rotatable about the first axis O1 together with the proximal end portion 31b of the handle arm 31.

The knob shaft 32 is fixed to the distal end portion 31a of the handle arm 31 so that the axis thereof is essentially parallel to the first axis O1. In the present embodiment, the axis of the knob shaft 32 is referred to as the third axis O3. In addition, the direction intersecting the third axis O3 according to a plan view of the third axis O3 as viewed from the axis direction thereof (left-right direction L1) can be referred to as the radial direction, and the direction encircling the third axis O3 can be referred to as the circumferential direction.

The handle knob 33 is mounted on the knob shaft 32 to be rotatable about the third axis O3 and is mounted on the distal end portion 31a of the handle arm 31 via the knob shaft 32. The knob shaft 32 and handle knob 33 will be described in detail below.

The handle assembly 3 configured as described above can be detached from the second mounting wall 21 such that the handle shaft 30 is drawn out from the drive shaft 60, and the handle assembly 3 can be mounted on the first mounting wall 20 side to change to a left-side handle. In this embodiment, the handle shaft 30 is connected to the drive shaft 60 to be incapable of relative rotation about the first axis O1 by insertion of the handle shaft 30 into the interior of the reel body 2 from the left side through the first mounting hole 22 and into the drive shaft 60.

A cap 18 for closing the first mounting hole 22 is detachably mounted on the first mounting wall 20. In the embodiment in which the handle assembly 3 is remounted on the first mounting wall 20 side, the cap 18 is configured to be mountable on the second mounting wall 21 side so as to close the second mounting hole 23.

Rotor

As shown in FIG. 1 and FIG. 2, the rotor 4 is disposed on the front side of the reel body 2 coaxially with the second axis O2 and comprises a cylindrical body 40, which is in the form of a cylinder with a top and a front wall portion 40a and a peripheral wall portion 40b, and a first arm portion 41 and a second arm portion 42 that are connected to the peripheral wall portion 40b.

The cylindrical body 40 is open to the rear and is combined with the reel body 2 from the front side so as to surround the front portion side of the reel body 2 from the radially outward side. A cylindrical boss portion 44, in which a through-hole 43 is formed that extends through the front wall portion 40a in the front-rear direction L2, is formed in the central portion of the front wall portion 40a so as to protrude rearward. The through-hole 43 is formed coaxially with the second axis O2. A cylindrical pinion shaft 45 and a spool shaft 46 are inserted into the interior of the boss portion 44 through the through-hole 43.

The pinion shaft 45 is rotatable about the second axis O2, and the front-end portion thereof extends farther forward than the front wall portion 40a. The front wall portion 40a is integrally connected to the pinion shaft 45 via a nut 47 mounted on the front-end portion of the pinion shaft 45. The rotor 4 is thus combined with the reel body 2 to be rotatable about the second axis O2.

The first arm portion 41 and the second arm portion 42 are connected to the rear end portion of the peripheral wall portion 40b and are disposed to face each other in the radial direction across the second axis O2. The first arm portion 41 and the second arm portion 42 are formed so as to extend forward from the rear end portion of the peripheral wall portion 40b, and the front-end portions thereof protrude farther forward than the front wall portion 40a.

A line roller 48 is rotatably attached to the front-end portion of the first arm portion 41, to which one end portion of a bail arm 49 is pivotably attached at the front end. Another line roller 48 is rotatably attached to the front-end portion of the second arm portion 42, to which the other end portion of the bail arm 49 is pivotably attached to the front end. The line roller 48 guides the fishing line to the spool 5. The bail arm 49 is disposed so as to connect the first arm portion 41 and the second arm portion 42 and is configured to be pivotable between a line-guiding position (state shown in FIGS. 1 and 2) for guiding the fishing line to the line roller 48, and a line-releasing position that is the reverse of the line-guiding position. It is possible to wind the fishing line onto the spool 5 via the line roller 48 by rotation of the rotor 4 about the second axis O2 with the bail arm 49 positioned in the line-guiding posture.

Spool

The spool 5, disposed on the front side of the rotor 4 coaxially with the second axis O2, comprises a bobbin trunk 50, around which the fishing line is wound, and a cylindrical skirt portion 51 that extends rearward from the rear end portion of the bobbin trunk 50 and surrounds the peripheral wall portion 40b of the cylindrical body 40 in the rotor 4 from the radially outward side.

The spool 5 is disposed so that the bobbin trunk 50 is positioned between the first arm portion 41 and the second arm portion 42 and is detachably fixed to the front-end portion of the spool shaft 46, which is disposed coaxially with the second axis O2. The spool shaft 46 is configured to be reciprocally movable along the second axis O2 by an oscillating mechanism 66, which is described below. The spool 5 is thereby reciprocally movable along the second axis O2 with respect to the reel body 2.

A drag adjustment mechanism 53 is mounted on the spool 5 and comprises a braking mechanism (not shown) disposed on the inner side of the bobbin trunk 50 and that brakes the rotation of the spool 5, and a drag adjustment knob 52 that is rotatably mounted on the front-end portion of the bobbin trunk 50 around the second axis O2 and that adjusts the braking force of the braking mechanism.

As shown in FIGS. 2 and 3, the cylindrical drive shaft 60, which is supported by the reel body 2 to be rotatable about the first axis O1 and which is connected to the handle assembly 3 via the handle shaft 30, a drive gear 61, formed on the drive shaft 60, a pinion gear 62, which meshes with the drive gear 61 and rotates about the second axis O2 with the rotation of the drive shaft 60, and a bearing 63, disposed between the drive gear 61 and the reel body 2 and which supports the drive shaft 60 to be rotatable about the first axis O1 are disposed in the housing space 13 of the reel body 2.

Furthermore, a rotor drive mechanism 65 that rotates the rotor 4 about the second axis O2 based on a rotational operation of the handle assembly 3, the oscillating mechanism 66 that reciprocates (i.e., provides back and forth movement) the spool 5 in the second axis O2 direction based on a rotation operation of the handle assembly 3, and an anti-reverse mechanism 67 of the rotor 4 are further disposed within the housing space 13 of the reel body 2.

Rotor Drive Mechanism

The rotor drive mechanism 65 primarily comprises the drive shaft 60, the drive gear 61, and the pinion gear 62.

As shown in FIG. 3, the drive shaft 60 is a cylindrical part made of metal that is formed by, for example, cold forging, and is disposed coaxially with the first axis O1, and both ends thereof are open in the left-right direction L1. The right end portion of the drive shaft 60 is disposed on the inner side of the second mounting hole 23 formed on the lid part 11 of the reel body 2 and is supported by the bearing 63 described above so as to be rotatable about the first axis O1, as well as being held by the lid part 11 via the bearing 63. The left end portion of the drive shaft 60 is disposed on the inner side of the first mounting hole 22 formed on the body portion 10 of the reel body 2 and is supported by a bearing (not shown), so as to be rotatable about the first axis O1, as well as being held by the body portion 10 via the bearing.

As described above, the handle shaft 30 is inserted into the drive shaft 60 from the right side and connected to be non-rotatable relative to the drive shaft 60. The drive shaft 60 thus rotates about the first axis O1 with the rotation of the handle assembly 3.

The drive gear 61 is integrally formed with, for example, the drive shaft 60. However, the present invention is not limited to this structure, and the drive gear 61 can be formed separately from the drive shaft 60 and combined with the drive shaft 60 to form one piece. The drive gear 61 is formed on a portion of the drive shaft 60 that is positioned between the pinion gear 62 and the second supporting cylinder 25 formed on the lid part 11 of the reel body 2. A plurality of teeth 61a that face rearward are formed over the entire circumference on the outer peripheral edge side of the drive gear 61.

As shown in FIG. 2, the pinion gear 62 is integrally formed with the cylindrical pinion shaft 45 that is disposed coaxially with the second axis O2. In the illustrated example, the pinion shaft 45 is disposed below the drive shaft 60 and positioned in front of the drive shaft 60. The pinion shaft 45 is supported by a plurality of bearings to be rotatable about the second axis O2 and is held by the reel body 2 via the plurality of bearings.

The pinion shaft 45 is inserted from the rear into the through-hole 43 that is formed in the boss portion 44 of the rotor 4, and the front-end portion thereof protrudes farther forward than the front wall portion 40a of the rotor 4. Screw threads 45a are formed on the outer circumferential surface of the front-end portion of the pinion shaft 45, and a nut 47 is attached via the screw threads 45a. As described above, the pinion shaft 45 and the rotor 4 are thereby integrally connected.

The spool shaft 46 is inserted on the inner side of the pinion shaft 45 so as to be relatively movable in the second axis O2 direction. The rear end portion of the spool shaft 46 is positioned behind the pinion shaft 45 and the drive shaft 60.

The pinion gear 62 has helical teeth 62a that mesh with the teeth 61a of the drive gear 61 and rotates about the second axis O2 with the rotation of the drive shaft 60 and the drive gear 61. It thereby is possible to rotate the rotor 4 about the second axis O2 via the pinion gear 62 and the pinion shaft 45.

Therefore, the rotor drive mechanism 65 transmits the rotational force that is generated by the rotation of the handle assembly 3 to the rotor 4.

Oscillating Mechanism

As shown in FIG. 2, the oscillating mechanism 66 comprises an intermediate gear 70 that meshes with the pinion gear 62, a worm shaft 71 that is disposed parallel to the spool shaft 46, and a slider 72 that reciprocates along the worm shaft 71 with the rotation of the worm shaft 71.

The worm shaft 71 is disposed in parallel below the spool shaft 46, and a helical groove portion 71a forming a so-called traverse cam groove is formed on the outer circumferential surface thereof. The worm shaft 71 is supported by the reel body 2 so as to be rotatable about a fourth axis O4 that is parallel to the second axis O2. The intermediate gear 70 is connected to the distal end portion of the worm shaft 71. The intermediate gear 70 and the worm shaft 71 thus rotate with the rotation of the pinion gear 62.

The slider 72 is connected to the rear end portion of the spool shaft 46 so as to be non-rotatable relative to the spool shaft 46. The slider 72 comprises an engagement piece 72a that engages a groove portion 71a of the worm shaft 71 to be relatively movable along the groove portion 71a. The slider 72 is guided by a guide shaft (not shown) disposed parallel to the worm shaft 71 and is configured to be movable while being guided by the guide shaft in the fourth axis O4 direction.

Thus, since the slider 72 is prevented from co-rotating about the fourth axis O4 with the rotation of the worm shaft 71 by the guide shaft, the rotational force of the worm shaft 71 is converted into a linear motive force by the groove portion 71a and the engagement piece 72a. It is therefore possible to reciprocate the slider 72 along the fourth axis O4 along the worm shaft 71 with the rotation of the worm shaft 71 and to reciprocate the spool shaft 46, which is fixed to the slider 72, along the second axis O2.

Accordingly, the oscillating mechanism 66 converts the rotational force that is generated by rotating the handle assembly 3 into a linear force and transmits the force to the spool 5.

Anti-Reverse Mechanism

As shown in FIG. 2, the anti-reverse mechanism 67 permits the rotation of the rotor 4 in the line-winding direction of the fishing line and prohibits the rotation of the rotor 4 in the opposite, casting (line-feeding) direction (that is, reverse rotation), and comprises, for example, a one-way clutch 75 that is disposed on the inner side of the cylindrical body 40 of the rotor 4.

The anti-reverse mechanism 67 is not limited to the configuration described above, and various well-known configurations may be employed. A switching lever 76 that switches the one-way clutch 75 between the above-described operating state (reverse rotation prohibited state) and a non-operating state (reverse rotation permitted state) is disposed on the lower portion side of the reel body 2.

Knob Shaft, Handle Knob

Next, the knob shaft 32 and the handle knob 33 in the handle assembly 3 will be described in detail.

Figure 4:
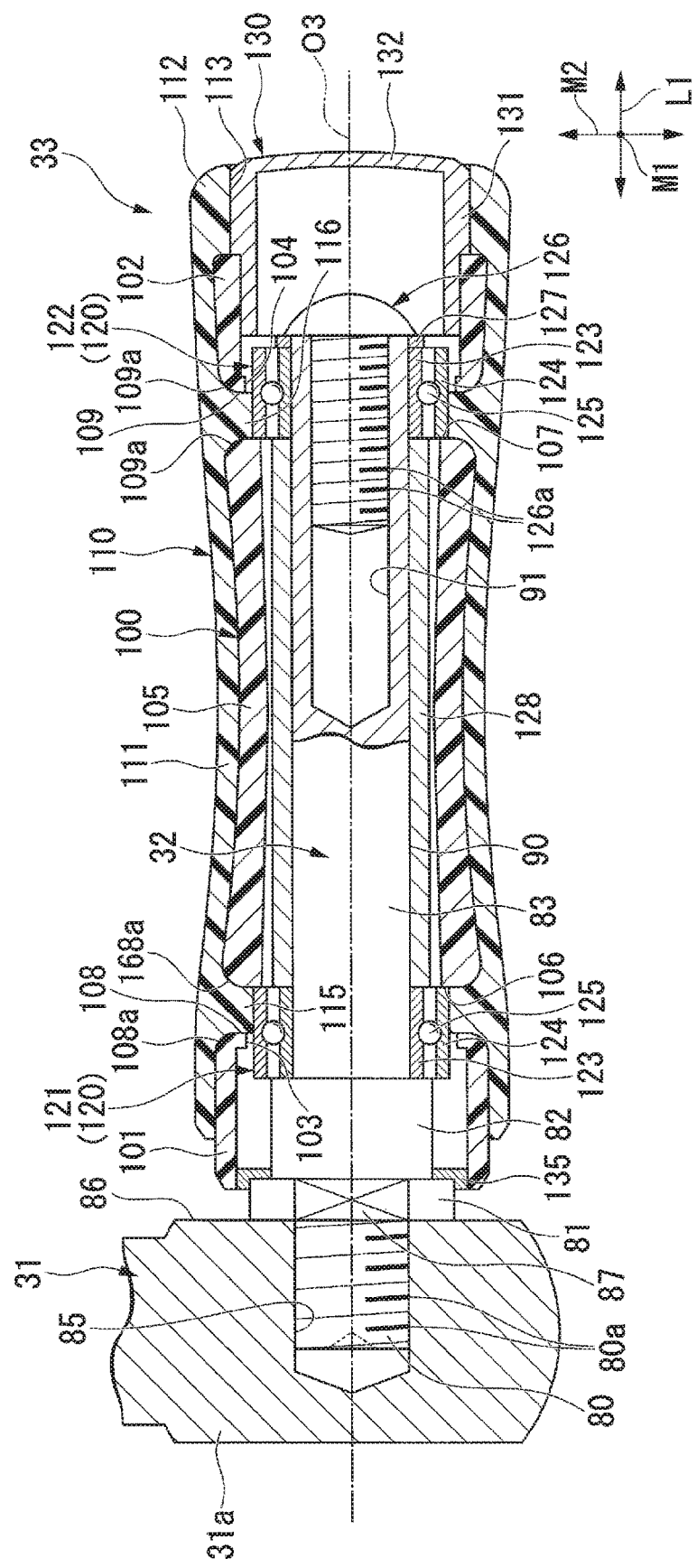
FIG. 4 is an enlarged cross-sectional view of the periphery of the handle knob shown in FIG. 3.

As shown in FIG. 4, the knob shaft 32 is a multistage shaft and comprises a screw shaft portion 80, on the outer circumferential surface of which is formed a threaded portion 80a (for example, male threads), a large diameter portion 81 disposed farther on the right side than the screw shaft portion 80 and having an outer diameter larger than that of the screw shaft portion 80, an intermediate diameter portion 82 disposed farther on the right side than the large diameter portion 81 and having an outer diameter larger than that of the screw shaft portion 80 but smaller than that of the large diameter portion 81, and a small diameter portion 83 that is disposed farther on the right side than the intermediate diameter portion 82 and having an outer diameter larger than that of the intermediate diameter portion 82.

The knob shaft 32 can be made of metal, such as aluminum or stainless steel, and is preferably corrosion-resistant due to the metal properties, surface treatment, etc., thereof.

The screw shaft portion 80 is threaded (screwed) into a screw hole 85 formed at the distal end portion 31a of the handle arm 31. The screw hole 85 is formed coaxially with the third axis O3 and opens onto a knob mounting wall surface 86 of the distal end portion 31a of the handle arm 31 facing the right side. A threaded portion (for example, female threads) (not shown), to which is screwed the threaded portion 80a of the screw shaft portion 80 can be formed on the inner circumferential surface thereof.

The large diameter portion 81 contacts the knob mounting wall surface 86 from the right side and prevents excessive tightening of the screw shaft portion 80 with respect to the screw hole 85. A plurality of flat chamfered portions 87 that can be engaged by a tool such as a wrench are formed at intervals in the circumferential direction on the outer circumferential surface of the large diameter portion 81, It is thus possible to use a tool to attach the screw shaft portion 80 to the screw hole 85.

The small diameter portion 83 is formed in an elongated cylindrical shape that extends along the third axis O3, and the outer circumferential surface of which is configured as an inner ring bearing surface 90 with which an inner ring 123 of a bearing 120, described below, contacts. A screw hole 91 that opens toward the right side is formed on the end surface of the right end portion of the small diameter portion 83 coaxially with the third axis O3. On the inner circumferential surface of the screw 91 a threaded portion (for example, female threads) (not shown) is formed to which is screwed a threaded portion 126a (for example, male threads) of a fixing screw 126, which is described below.

Figure 5:
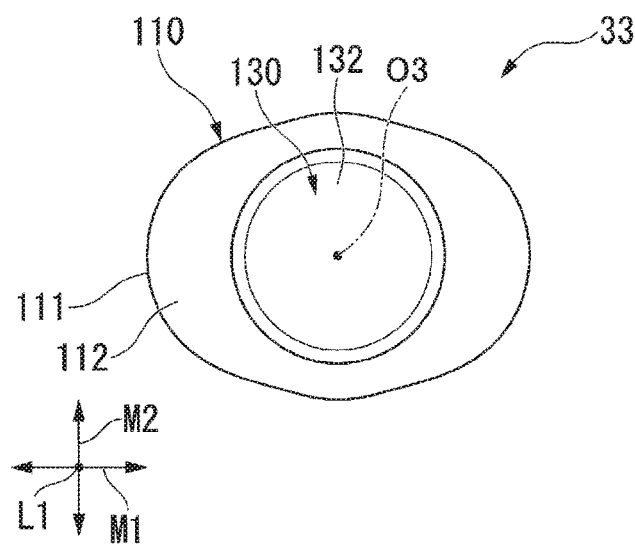
FIG. 5 is a side view of the handle knob shown in FIG. 4 as seen from a handle cap side.

As shown in FIGS. 4 and 5, the handle knob 33 comprises an inner knob 100 formed in a tubular shape that surrounds the knob shaft 32 from the radially outward side, an outer knob 110 formed in a tubular shape that further surrounds at least a portion of the inner knob 100 from the radially outward side, the bearing 120 disposed between the inner knob 100 and the knob shaft 32 and rotatably supporting the inner knob 100 on the knob shaft 32 around the third axis O3, and a handle cap 130 formed as a tube with a top.

The inner knob 100 is configured as, for example, a molded part formed by injection molding utilizing a molding die and is made from a synthetic resin.

Specifically, the inner knob 100 is formed from a thermoplastic resin, such as polypropylene. However, the present invention is not particularly limited to this structure; for example, the inner knob 100 can be formed from a thermosetting resin, or, the inner knob 100 can be formed from so-called fiber-reinforced resin in which reinforcing fibers such as glass fibers, carbon fibers, or boron fibers, are mixed into a synthetic resin. Furthermore, the inner knob 100 is not limited to being formed by injection molding, and can be made of metal formed by mechanical processing, such as machining.

The outer knob 110 is made of resin that is integrally formed with the inner knob 100.

Specifically, the outer knob 110 is formed from an elastomer resin, such as a thermoplastic elastomer. The method for integrally forming the outer knob 110 with the inner knob 100 is not particularly limited, but in the present embodiment, the outer knob 110 is integrally formed by insert molding, in which the inner knob 100 is used as an insert component. Insert molding will be described briefly below.

The inner knob 100 is formed in a tubular shape that is open in the left-right direction L1 and that surrounds a portion of the large diameter portion 81, the intermediate diameter portion 82, and the small diameter portion 83 of the knob shaft 32 from the radially outward side, and is formed protruding farther toward the right side than the right end portion of the small diameter portion 83. Accordingly, the left end portion 101 side of the inner knob 100 surrounds a portion of the large diameter portion 81 and the intermediate diameter portion 82 of the knob shaft 32 from the radially outward side, and the right end portion 102 of the inner knob 100 is disposed farther on the right side than the right end portion of the knob shaft 32 surrounding the right end portion of the knob shaft 32 from the radially outward side.

As shown in FIGS. 4 and 6-8, the outer shape of the inner knob 100 is formed with an elliptical shape in a cross-sectional view taken along a plane that is orthogonal to the third axis O3. That is, if two directions of the radial direction of the inner knob 100 that are orthogonal to each other are defined as a first direction M1 and a second direction M2, the outer shape of the inner knob 100 is formed with an elliptical shape that is longer in the first direction than in the second direction in the cross-sectional view described above. However, the outer shape of the inner knob 100 is not particularly limited to this structure and may be formed in a circular shape, a polygonal shape, etc., in the cross-sectional view described above.

Figure 6:
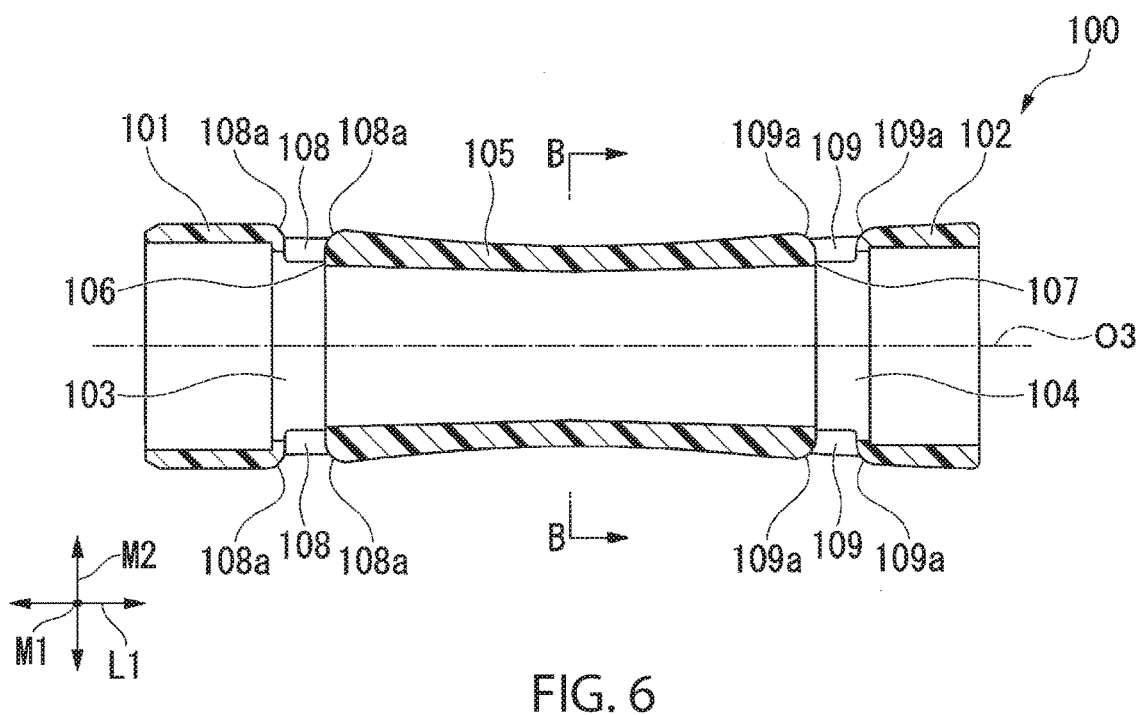
FIG. 6 is a cross-sectional view of the inner knob shown in FIG. 4.
Figure 7:
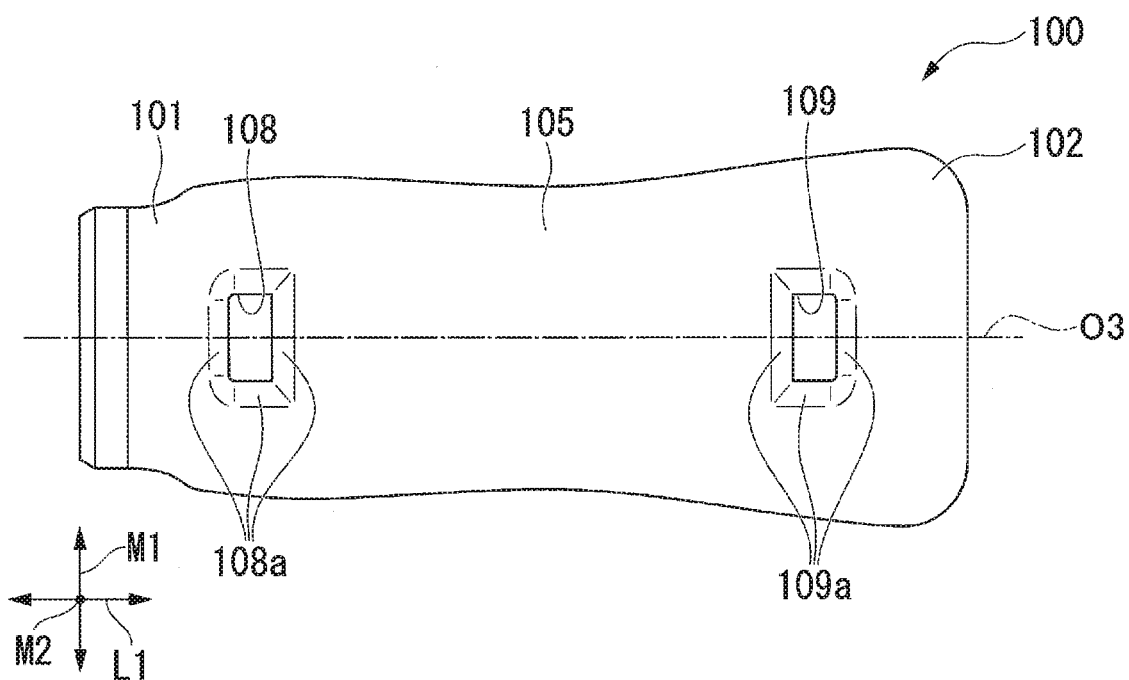
FIG. 7 is a plan view of the inner knob shown in FIG. 6 as seen from a second direction side.

Furthermore, as shown in FIGS. 6 and 7, the major axis (length in the first direction M1) of the inner knob 100 is slightly longer at the right end portion 102 side than the left end portion 101 side, and the major axis and the minor axis (length in the second direction M2) change appropriately between the left end portion 101 side and the right end portion 102 side. In the illustrated example, the inner knob 100 has a so-called constricted shape in which the central portion in the left-right direction L1 is narrowest.

Figure 8:
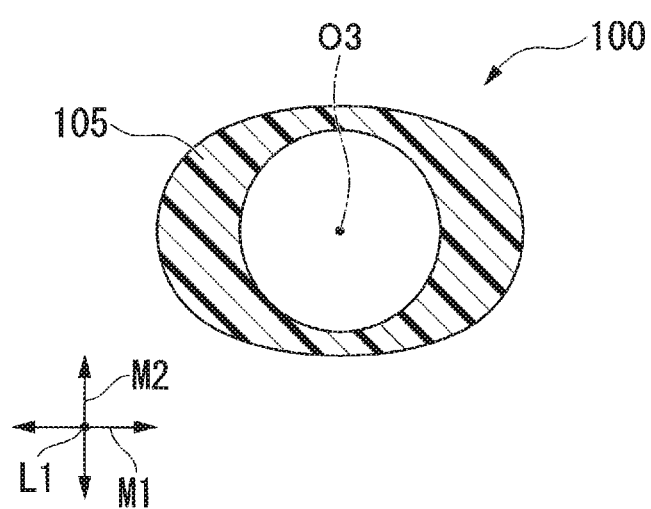
FIG. 8 is a cross-sectional view of the inner knob taken along the B-B line shown in FIG. 6.
Figure 9:
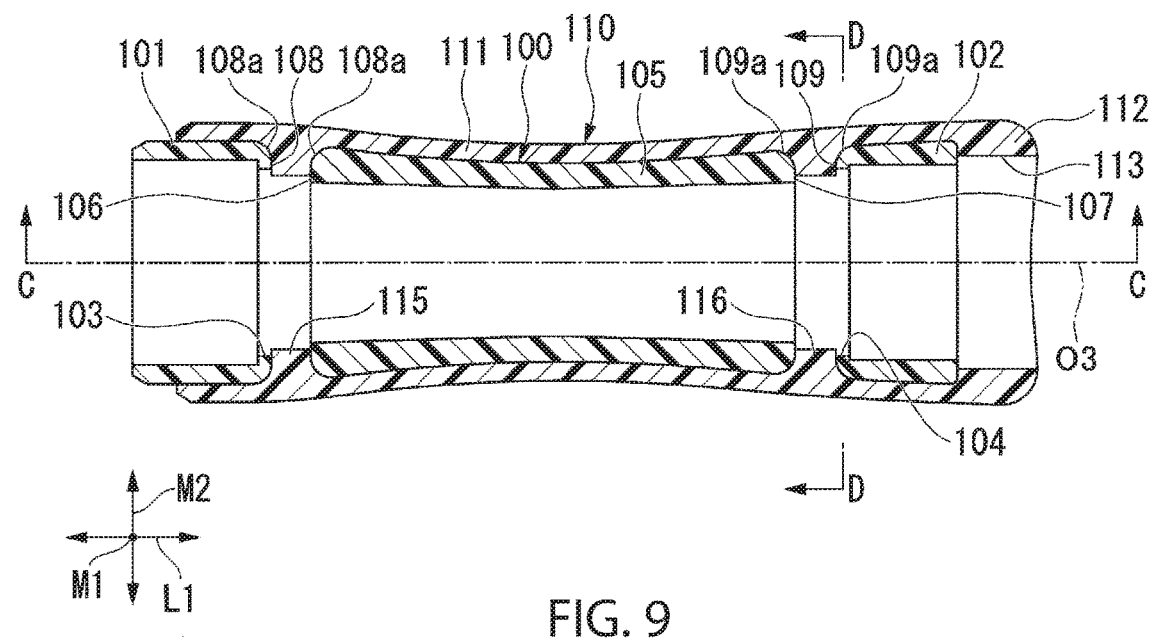
FIG. 9 is a cross-sectional view of an inner knob and an outer knob in a state in which the outer knob is integrally combined with the inner knob shown in FIG. 4.
Figure 10:
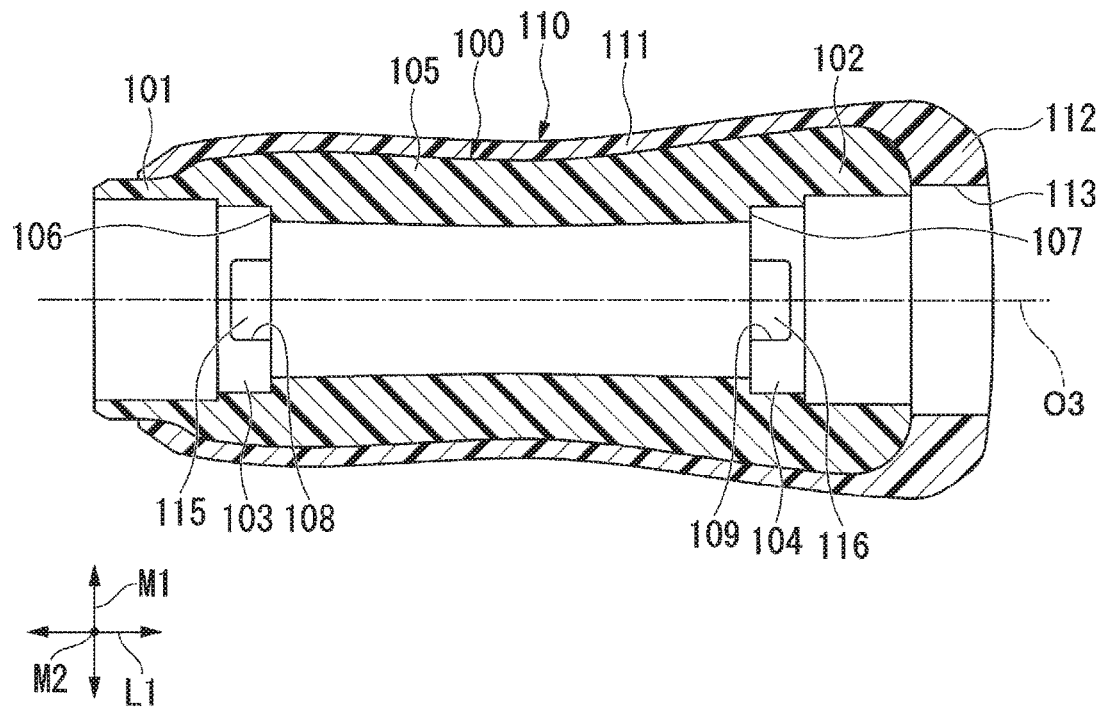
FIG. 10 is a cross-sectional view of the inner knob and the outer knob taken along the C-C line shown in FIG. 9.

The inner surface shape of the inner knob 100 is different from the outer shape, as described above, and has a circular shape in the cross-sectional view described above. Thus, as shown in FIG. 8, the wall thickness of the inner knob 100 is thicker in the first direction M1 than in the second direction M2.

The inner diameter of the inner knob 100 changes appropriately between the left end portion 101 side and the right end portion 102 side.

Specifically, as shown in FIGS. 4 and 6, the inner diameter of the inner knob 100 at the left end portion 101 side is larger than the outer diameter of the large diameter portion 81 of the knob shaft 32. The inner diameter of the portion of the inner knob 100 that is positioned farther on the right side than the left end portion 101 and that surrounds the bearing 120 from the radially outward side is slightly smaller than the inner diameter of the left end portion 101 and is essentially the same diameter as the diameter of the outer ring 124 of the bearing 120. Therefore, the inner surface of this portion is a first outer ring bearing surface (bearing surface) 103 with which the outer ring 124 of the bearing 120 contacts.

The inner diameter of the right end portion 102 side of the inner knob 100 has essentially the same diameter as the inner diameter of the left end portion 101 side. The inner diameter of the portion of the inner knob 100 positioned farther on the left side than the right end portion 102 and surrounding the bearing 120 from the radially outward side is slightly smaller than the inner diameter of the right end portion 102 and is essentially the same diameter as the diameter of the outer ring 124 of the bearing 120. Therefore, the inner surface of this portion is a second outer ring bearing surface (bearing surface) 104 with which the outer ring 124 of the bearing 120 contacts.

The inner diameter of the intermediate portion 105 of the inner knob 100 positioned between the first outer ring bearing surface 103 and the second outer ring bearing surface 104 is smaller than the outer diameter of the outer ring 124 of the bearing 120. In the illustrated example, the inner diameter of the intermediate portion 105 described above is formed so that the diameter is smallest at the central portion of the intermediate portion 105 and so that the diameter gradually increases from the central portion toward the right side and the left side. In this embodiment, the inner diameters of the right side and the left side of the intermediate portion 105 are larger than the inner diameter of the central portion of the intermediate portion 105 but smaller than the outer diameter of the outer ring 124 of the bearing 120.

However, the present invention is not limited to this structure, and the intermediate portion 105 may be formed so that, for example, the inner diameter is constant along the third axis O3 direction.

Since the inner diameter of the intermediate portion 105 of the inner knob 100 is smaller than the outer diameter of the outer ring 124 of the bearing 120, a step that has an annular first peripheral wall 106 that faces the left side is formed in the connection portion between the first outer ring bearing surface 103 and the intermediate portion 105, and a step that has an annular second peripheral wall 107 that faces the right side is formed in the connection portion between the second outer ring bearing surface 104 and the intermediate portion 105.

A first through-hole (through-hole) 108 for inserting an insertion portion of the outer knob 110 is formed on the first outer ring bearing surface 103, the first-through hole 108 opening onto the first outer ring bearing surface 103 while penetrating the inner knob 100 in the radial direction. Similarly, a second through-hole (through-hole) 109 for inserting an insertion portion of the outer knob 110 is formed on the second outer ring bearing surface 104, the second-through hole opening onto the second outer ring bearing surface 104 while penetrating the inner knob 100 in the radial direction.

A plurality of the first through-holes 108 and of the second through-holes 109 are respectively formed at intervals in the circumferential direction (at intervals around the third axis O3).

In the present embodiment, a pair of the first through-holes 108 are formed and disposed so as to face each other in the radial direction across the third axis O3. Similarly, a pair of second through-holes 109 are formed and disposed so as to face each other in the radial direction across the third axis O3. The pair of first through-holes 108 and the pair of second through-holes 109 are respectively arranged to face each other along the second direction M2.

As shown in FIG. 7, the first through-hole 108 and the second through-hole 109 are formed with a rectangular shape in a plan view that is slightly longer in the circumferential direction than in the third axis O3 direction. However, the shape of the first through-hole 108 and the second through-hole 109 is not limited to this shape and may be formed, for example, with a circular shape, a square shape, an elliptical shape, or a polygonal shape in a plan view.

A first guide surface (guide surface) 108a and a second guide surface (guide surface) 109a are formed on the outer surface of the inner knob 100 so as to surround the openings of the first through-hole 108 and the second through-hole 109, respectively.

The first guide surface 108a is formed along the peripheral edge of the opening of the first through-hole 108 and gradually extends toward the first through-hole 108 side from the outer surface side to the inner surface side of the inner knob 100. Similarly, the second guide surface 109a is formed along the peripheral edge of the opening of the second through-hole 109 and gradually extends toward the second through-hole 109 side from the outer surface side to the inner surface side of the inner knob 100.

In the illustrated example, the first guide surface 108a and the second guide surface 109a are smooth curved surfaces. However, these surfaces are not necessarily limited to this structure; for example, the first guide surface 108a and the second guide surface 109a can be obliquely inclined surfaces.

As shown in FIG. 4, two bearings 120, which are spaced apart in the third axis O3 direction, are arranged between the inner knob 100 and the small diameter portion 83 of the knob shaft 32. In the present embodiment, the bearing 120 that is positioned on the intermediate diameter portion 82 side is referred to as a first bearing 121, and the bearing 120 that is positioned on the right end portion 102 side of the small diameter portion 83 is referred to as a second bearing 122.

The first bearing 121 and the second bearing 122 have the same configuration and comprise the inner ring 123 that is fitted to the outer surface of the small diameter portion 83 of the knob shaft 32, the outer ring 124 that is fitted to the inner surface of the inner knob 100, and a plurality of rolling bodies 125 that are rollably held between the inner ring 123 and the outer ring 124.

The first bearing 121 is disposed on a portion of the small diameter portion 83 of the knob shaft 32 that is positioned on the intermediate diameter portion 82 side. The inner ring 123 of the first bearing 121 is firmly fitted to the inner ring bearing surface 90 of the small diameter portion 83 by contacting (abutting) the intermediate diameter portion 82 from the right side. The outer ring 124 of the first bearing 121 is firmly fitted to the first outer ring bearing surface 103 of the inner knob 100 by contacting (abutting) the first peripheral wall 106 of the inner knob 100 from the left side. Thus, the first bearing 121 is held between the knob shaft 32 and the inner knob 100 while positioned in the third axis O3 direction by the intermediate diameter portion 82 and the first peripheral wall 106.

The second bearing 122 is disposed on the right end portion 102 side of the small diameter portion 83 of the knob shaft 32. The inner ring 123 of the second bearing 122 is firmly fitted to the inner ring bearing surface 90 of the small diameter portion 83. The outer ring 124 of the second bearing 122 is firmly fitted to the second outer ring bearing surface 104 of the inner knob 100 by contacting (abutting) the second peripheral wall 107 of the inner knob 100 from the right side.

A fixing screw 126 is threaded (screwed) into the screw hole 91 formed on the right end surface of the knob shaft 32 from the right side. The head portion of the fixing screw 126 contacts (abuts) the inner ring 123 of the second bearing 122 from the right side via a washer 127. In other words, the inner ring 123 of the second bearing 122 is in contact with the head portion of the fixing screw 126 relatively from the left side via the washer 127, and is retained with respect to the knob shaft 32 by the fixing screw 126. Accordingly, the second bearing 122 is mounted between the knob shaft 32 and the inner knob 100 while being positioned in the third axis O3 direction by the fixing screw 126 and the second peripheral wall 107. The fixing screw 126 also functions as a retainer for the inner knob 100 and the outer knob 110 with respect to the knob shaft 32.

A cylindrical collar 128 that surrounds the small diameter portion 83 from the radially outward side is disposed between the first bearing 121 and the second bearing 122. The collar 128 is mounted to cover the small diameter portion 83 from the right side and contacts the inner ring 123 of the first bearing 121 from the right side while in contact with the inner ring 123 of the second bearing 122 from the left side. Thus, the first bearing 121 and the second bearing 122 are more precisely positioned in the third axis O3 direction by the collar 128. However, the collar 128 is not essential and may be not provided.

As shown in FIGS. 4, 5, and 9-11, the outer knob 110 is a tube with a top and is open on the left side and includes a cylindrical outer shell tube portion 111 that surrounds portions of the inner knob 100 excluding the left end portion 101 from the radially outward side, and a closing portion 112 that closes the right side opening of the outer shell tube portion 111.

The outer shell tube portion 111 is formed such that the outer shape thereof corresponds to the outer shape of the inner knob 100. Accordingly, the outer shape of the outer shell tube portion 111 is formed in an elliptical shape that is longer in the first direction M1 than in the second direction M2, in a cross-sectional view taken along a plane that is orthogonal to the third axis O3.

The closing portion 112 is disposed farther on the right side than the right end portion 102 of the inner knob 100. A cap mounting hole 113 is formed on the closing portion 112 to penetrate the closing portion 112 in the left-right direction L1. The cap mounting hole 113 has a circular shape in a plan view and is coaxially with the third axis O3. The diameter of the cap mounting hole 113 is slightly larger than the inner diameter of the right end portion 102 of the inner knob 100.

As shown in FIGS. 4 and 9-12, a first insertion portion 115 and a second insertion portion 116 that are respectively inserted into the first through-hole 108 and the second through-hole 109 are integrally formed on the outer shell tube portion 111 of the outer knob 110.

Figure 11:
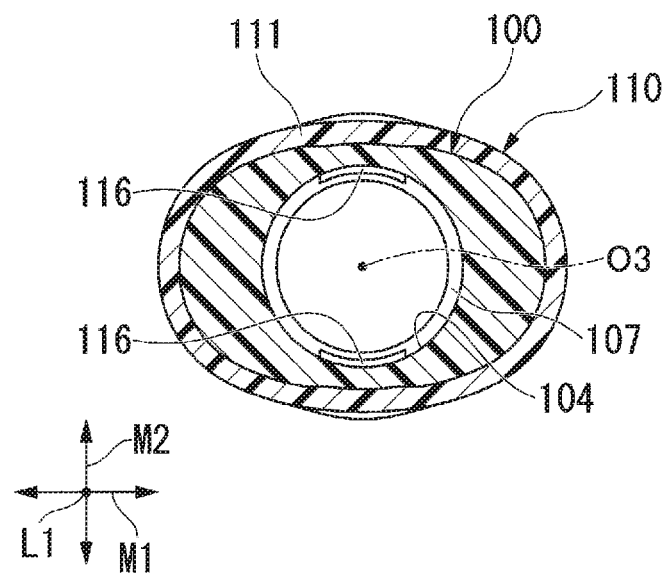
FIG. 11 is a cross-sectional view of the inner knob and the outer knob taken along the D-D line shown in FIG. 9.
Figure 12:
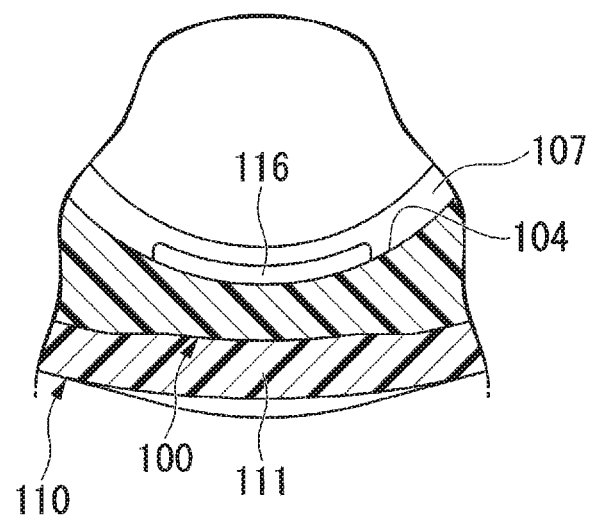
FIG. 12 is an enlarged cross-sectional view of the periphery of a second insertion portion shown in FIG. 11.

In FIGS. 11 and 12, the illustrations of the first insertion portion 115 and the second insertion portion 116 are emphasized in order to make the drawings more readily viewable to facilitate an understanding of the invention.

The first insertion portion 115 is inserted into the first through-hole 108, entering from the radially outward side, and also protrudes farther toward the third axis O3 side than the first outer ring bearing surface 103 to press the outer ring 124 of the first bearing 121 from the radially outward side. Similarly, the second insertion portion 116 is inserted into the second through-hole 109, entering from the radially outward side, and also protrudes farther toward the third axis O3 side than the second outer ring bearing surface 104 to press the outer ring 124 of the second bearing 122 from the radially outward side.

As shown in FIGS. 4 and 5, the handle cap 130 is a tube with a top and includes a cap tube portion 131 that is tightly (liquid-tight, airtight, etc.) fitted to the inner side of the cap mounting hole 113 of the outer knob 110 and a cap lid portion 132 that closes the right side opening of the cap tube portion 131, and removably closes the cap mounting hole 113.

The handle cap 130 is a metal, such as aluminum or stainless steel, and is preferably corrosion-resistant due to the metal properties, surface treatment, etc., thereof.

In the present embodiment, the cap tube portion 131 is also tightly fitted to the inner side of the right end portion 102 of the inner knob 100.

However, the invention is not necessarily limited to this structure; it is sufficient if the cap tube portion 131 is fitted to at least the inner side of the cap mounting hole 113 of the outer knob 110. Additionally, an engagement recess can be formed on one of either the cap tube portion 131 or the cap mounting hole 113, and an engagement projection that removably engages with the engagement recess may be formed on the other element. In this embodiment, it is possible to firmly fit the handle cap 130 to the inner side of the cap mounting hole 113 and effectively prevent the handle cap 130 from falling off.

Furthermore, the present invention is not limited to fitting the cap; for example, the handle cap 130 may be configured so that the cap tube portion 131 is screwed to the inner side of the cap mounting hole 113.

In a handle knob 33 configured as described above, an annular elastic body 135 (for example, a rubber packing, or the like) is mounted between the inner knob 100 and the large diameter portion 81 of the knob shaft 32, as shown in FIG. 4. The elastic body 135 is elastically deformable in the radial direction and is mounted so as to be sandwiched between the inner knob 100 and the large diameter portion 81 of the knob shaft 32, while elastically deformed in the radial direction. As a result, the elastic body 135 tightly seals (liquid-tight, airtight, etc.) the space between the inner knob 100 and the large diameter portion 81 of the knob shaft 32.

Forming Processes for the Inner Knob and the Outer Knob

Next, the forming processes for the inner knob 100 and the outer knob 110 of the handle knob 33 configured as described above will be briefly described.

When forming the inner knob 100 shown in FIGS. 6-8, the formation can be carried out by insert molding, in which molten resin is injected into a molding die for an inner knob 100, after which the injected molten resin is cured. Next, when forming the outer knob 110, the inner knob 100 obtained by injection molding is used as an insert component, which is placed inside a molding die for an outer knob 110. Next, molten resin is injected between the inner knob 100 and the molding die, after which the molten resin is cured; the outer knob 110 can be formed by the above-described insert molding. As shown in FIGS. 9-12, it is possible to integrate the outer knob 110 with the inner knob 100 and to securely combine the two by the above-described insert molding.

At the time of the insert molding, the molten resin that will become the outer knob 110 enters the first through-hole 108 and the second through-hole 109, which are formed on the inner knob 100. The molten resin that has entered the first through-hole 108 and the second through-hole 109 functions as the first insertion portion 115 and the second insertion portion 116.

At this time, a first guide surface 108a is on the outer surface of the inner knob 100 along the peripheral edge of the opening of the first through-hole 108, and a second guide surface 109a is formed along the peripheral edge of the opening of the second through-hole 109; therefore, it is possible to actively introduce the molten resin into the first through-hole 108 and the second through-hole 109 using the first guide surface 108a and the second guide surface 109a. Thus, it is possible to for the molten resin that enters the first through-hole 108 and the second through-hole 109 to function as the first insertion portion 115 and the second insertion portion 116, without influence from, for example, the viscosity, etc., of the molten resin. It is therefore possible to expand the selection of resins for forming the outer knob 110 and to enhance the degree of freedom of design.

Attachment of the Handle Knob

Next, an embodiment in which the handle knob 33 configured as described above is mounted on a knob shaft 32 that is mounted on the distal end portion 31a of the handle arm 31 shown in FIG. 4.

In this embodiment, first, the elastic body 135 is fitted to the large diameter portion 81 of the knob shaft 32 that is mounted on the distal end portion 31a of the handle arm 31 and then the inner ring 123 is fitted to the inner ring bearing surface 90 of the small diameter portion 83 when the inner ring 123 of the first bearing 121 is brought into contact with the large diameter portion 81, to set the first bearing 121. Next, the inner knob 100, with which the outer knob 110 is integrally combined, covers the knob shaft 32 from the right side, and the outer ring 124 is fitted to the inner side of the first outer ring bearing surface 103, when the outer ring 124 of the first bearing 121 and the first peripheral wall 106 are brought into contact.

It is thereby possible to set the first bearing 121 between the knob shaft 32 and the inner knob 100. At the same time, it is possible to interpose and fix the elastic body 135 between the inner knob 100 and the large diameter portion 81.

Rather than setting the first bearing 121 on the knob shaft 32 first, it is also possible to set the first bearing 121 on the inner side of the first outer ring bearing surface 103 of the inner knob 100 first and then fit the inner ring 123 of the first bearing 121 to the inner ring bearing surface 90 of the small diameter portion 83 along with the setting of the inner knob 100 with respect to the knob shaft 32.

After setting the first bearing 121 between the knob shaft 32 and the inner knob 100, the collar 128 is inserted from the right side so as to cover the small diameter portion 83 of the knob shaft 32. At this time, the collar 128 is pushed and set so as to contact the inner ring 123 of the first bearing 121. Next, the second bearing 122 is fit between the small diameter portion 83 of the knob shaft 32 and the inner knob 100 from the right side, and the inner ring 123 is fit to the inner ring bearing surface 90 of the small diameter portion 83 while the outer ring 124 is fit to the inner side of the second outer ring bearing surface 104 of the inner knob 100. It is thereby possible to set the second bearing 122 between the knob shaft 32 and the inner knob 100.

After placing the second bearing 122 between the knob shaft 32 and the inner knob 100, the washer 127 is placed on the small diameter portion 83 from the right side, and the fixing screw 126 is threaded into the screw hole 91 of the small diameter portion 83. It is thereby possible to combine the first bearing 121, the second bearing 122, the inner knob 100, and the outer knob 110 with the knob shaft 32. Finally, the handle cap 130 is mounted by being fit inside the cap mounting hole 113 of the outer knob 110. As a result, as shown in FIG. 4, it is possible to attach the handle knob 33 to the knob shaft 32 to be rotatable about the third axis O3.

Action of the Spinning Reel

Next, an embodiment in which a spinning reel 1 is configured as described above is used will be briefly described.

When casting, the bail arm 49 is dropped from the position shown in FIG. 1 and FIG. 2 to a line-releasing position, and the fishing rod R is swung forward. Fishing line that has been wound around the bobbin trunk 50 of the spool 5 can thus be cast forward.

Thereafter, when the fishing line is wound, the bail arm 49 is returned to the line-guiding position, as shown in FIGS. 1 and 2. The fishing line is thereby guided to the line roller 48 by the bail arm 49. In this state, handle operations are carried out by appropriately rotating the handle assembly 3 about the first axis O1 while gripping the handle knob 33. At this time, handle operations can be carried out while appropriately rotating the handle knob 33 about the third axis O3.

Since the rotational force of the handle assembly 3 is transmitted to the rotor 4 by the rotor drive mechanism 65, the rotor 4 can be rotated about the second axis O2. At the same time, since the rotational force of the handle assembly 3 is transmitted to the spool 5 by the oscillating mechanism 66, the spool 5 can be reciprocated along the second axis O2.

As a result, it is possible to rotate the rotor 4 as the spool 5 moves reciprocatingly in the front-rear direction L2 and to wind the fishing line uniformly onto the bobbin trunk 50 of the spool 5 via the line roller 48.

In particular, in accordance with the handle knob 33 of the present embodiment, since it is possible to integrally form the outer knob 110 with the inner knob 100 by insert molding, it is possible to form the outer knob 110 into a desired shape and to respond to various requirements, such as weight reduction and improved grip performance.

Moreover, since the first through-hole 108 and the second through-hole 109, which open onto the first outer ring bearing surface 103 and the second outer ring bearing surface 104, are formed on the inner knob 100, and a first insertion portion 115 and a second insertion portion 116 are inserted into the first through-hole 108 and the second through-hole 109, it is possible to integrally form the outer knob 110 with the inner knob 100 in a positioned state. Thus, the outer knob 110 can be combined with the inner knob 100 while suppressing positional displacement, rattling, etc., without influence from the molding precision and the shape of the inner knob 100.

Therefore, it is possible to provide a handle knob 33 in which an outer knob 110 is precisely combined with an inner knob 100 and to suppress deterioration of the fitting and gripping properties, so that the handle knob 33 itself is less susceptible to rattling, etc. As a result, it is possible to attach a handle knob 33 to a knob shaft 32 via a first bearing 121 and a second bearing 122 with little rattling and to smoothly carry out handle operations of the spinning reel 1, thereby contributing to improving handle operability.

In addition, according to the spinning reel 1 of the present embodiment, it is possible to carry out handle operations smoothly with little rattling and to smoothly wind the fishing line by using the handle knob 33. Therefore, it is possible to provide a high-quality, high-performance spinning reel 1 with improved operability.

Furthermore, as shown in FIG. 4, in the handle knob 33 of the present embodiment, the first insertion portion 115 and the second insertion portion 116 of the outer knob 110 that are inserted into the first through-hole 108 and the second through-hole 109 press against the outer ring 124 of the first bearing 121 and the outer ring 124 of the second bearing 122 from the radially outward side. Thus, even in the embodiment in which slight rattling occurs between the outer ring 124 and the first outer ring bearing surface 103 of the inner knob 100, as well as between the outer ring 124 and the second outer ring bearing surface 104, due, for example, to the molding precision and the shape of the inner knob 100, it is possible to press against the outer ring 124 of the first bearing 121 and the outer ring 124 of the second bearing 122 so as to press from the radially outward side.

As a result, it is possible to attach the first bearing 121 and the second bearing 122 between the inner knob 100 and the knob shaft 32 so as to press-fit the outer ring 124 onto the inner surface side of the inner knob 100 and to firmly fit the outer ring 124 of the first bearing 121 and the outer ring 124 of the second bearing 122 to the inner knob 100.

Therefore, it is possible to reliably hold the first bearing 121 and the second bearing 122 on the inner side of the inner knob 100 without influence from the molding precision and the shape of the inner knob 100, etc. That is, it is possible to suppress rattling between the inner knob 100 and first bearing 121 and the second bearing 122. Thus, it is possible to attach the handle knob 33 to the knob shaft 32 via the first bearing 121 and the second bearing 122 with little or no rattling. As a result, it is possible to smoothly carry out handle operations of the spinning reel 1 and to contribute to improving handle operability.

Moreover, the first through-holes 108 and the second through-holes 109 are each integrally formed at intervals in the circumferential direction and are arranged so as to face each other in the radial direction across the third axis O3. The first insertion portions 115 are then respectively inserted into a pair of first through-holes 108, and the second insertion portions 116 are respectively inserted into a pair of second through-holes 109.

Thus, it is possible to precisely combine the outer knob 110 to further suppress positional displacement, rattling, etc. with respect to the inner knob 100. In addition, since the first insertion portions 115 and the second insertion portions 116 are respectively arranged to oppose each other in the radial direction, the weight balance of the entire handle knob 33 is less susceptible to nonuniformity. Therefore, it is possible to stably and smoothly carry out handle operations of the spinning reel 1.

Furthermore, since it is possible to press a plurality of locations (two locations) of the outer ring 124 of the first bearing 121 and a plurality of locations (two locations) of the outer ring 124 of the second bearing 122 from the radially outward side by using the first insertion portions 115 and the second insertion portions 116, the first bearing 121 and the second bearing 122 can be stably held further suppress rattling. Moreover, because the outer ring 124 of the first bearing 121 and the outer ring 124 of the second bearing 122 can be respectively pressed so as to be sandwiched from the radial direction, it is possible to stably hold the first bearing 121 and the second bearing 122. In addition, the outer ring 124 of the first bearing 121 and the outer ring 124 of the second bearing 122 are less susceptible to positional displacement in the radial direction, so that it is possible to precisely arrange the center of the first bearing 121 and the center of the second bearing 122 on the third axis O3. Therefore, it is possible to smoothly carry out handle operations of the spinning reel 1.

In addition, since the outer knob 110 is an elastomer resin, it is possible to impart elasticity to the entire outer knob 110 and thus provide a handle knob 33 with enhanced fitting and gripping properties. Furthermore, since it is possible to attach the outer ring 124 of the first bearing 121 and the outer ring 124 of the second bearing 122 when the first insertion portion 115 and the second insertion portion 116 of the outer knob 110 are each elastically deformed, it is possible to extend the amount of protrusion of the first insertion portion 115 and the second insertion portion 116 from the first outer ring bearing surface 103 and the second outer ring bearing surface 104 toward the third axis O3 side. As a result, it is possible to secure a press-fitting margin (press-fitting margin) of the first bearing 121 and the second bearing 122 by that amount and to more stably hold the first bearing 121 and the second bearing 122.

Embodiment 2

Next, a second embodiment of the handle knob and the fishing reel according to the present invention will be described below with reference to the drawings. In this second embodiment, the portions that are the same as compositional elements of the first embodiment have been assigned the same reference symbols, and descriptions thereof are omitted.

In the first embodiment, the handle knob 33 is applied to the spinning reel 1, but in the present embodiment, the handle knob 33 is applied to a dual-bearing reel.

Figure 13:
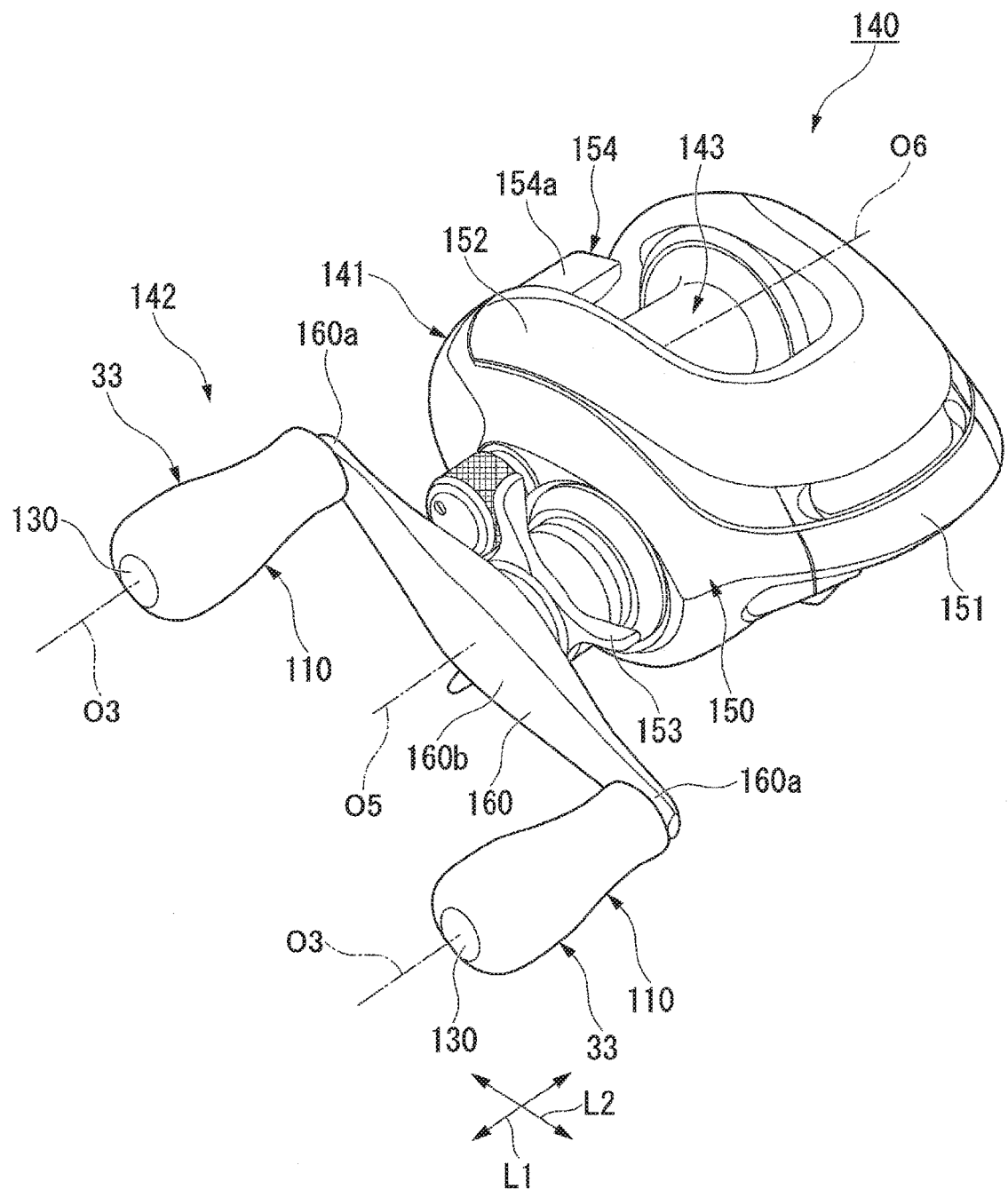
FIG. 13 is a perspective view of a dual-bearing reel illustrating a second embodiment of the present invention.
Figure 14:
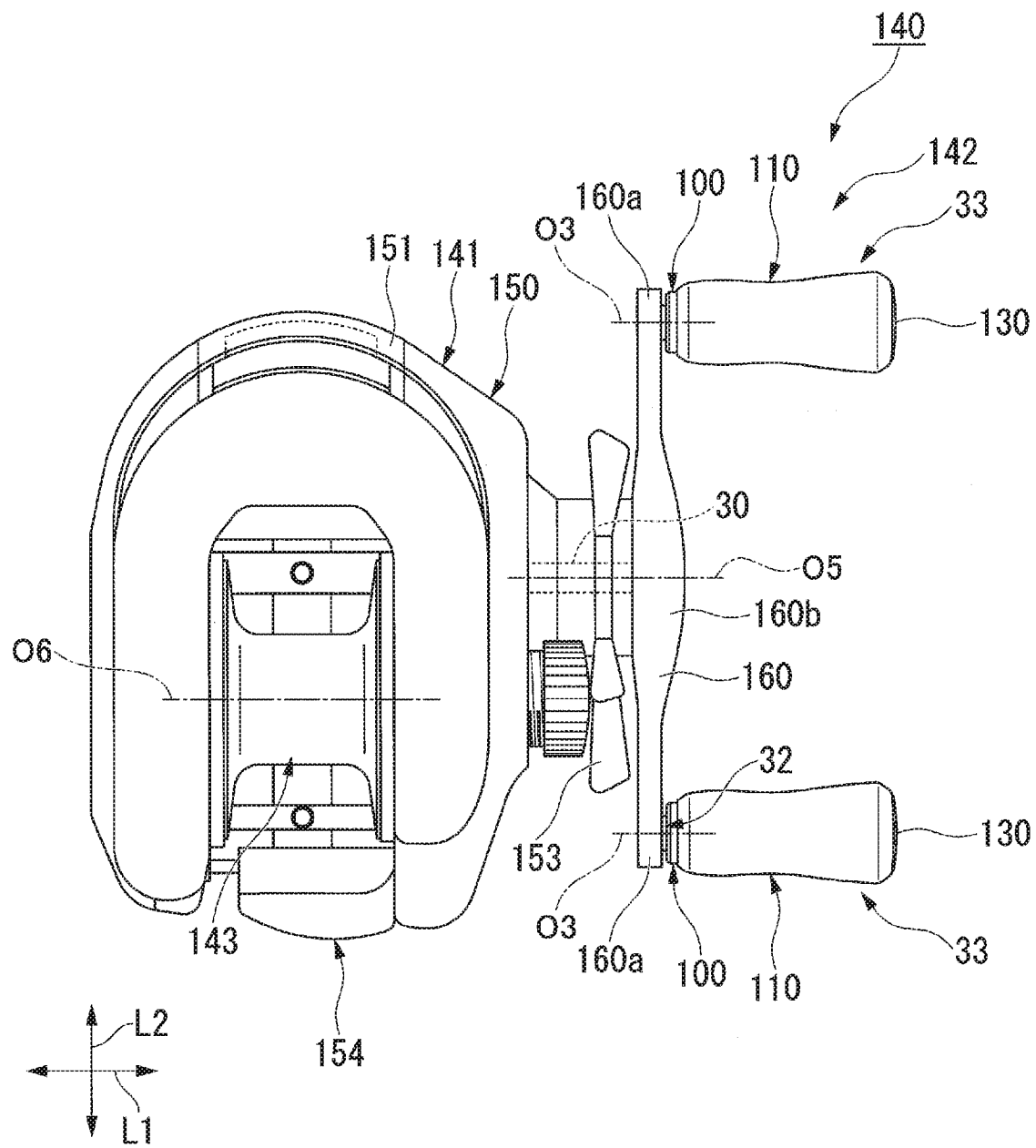
FIG. 14 is a plan view of the dual-bearing reel shown in FIG. 13 as seen from below.

As shown in FIGS. 13 and 14, a dual-bearing reel (fishing reel) 140 according to the present embodiment mainly comprises a reel body 141, a handle assembly 142 that is mounted on the reel body 141 to be rotatable about a fifth axis O5, and a spool 143 that is mounted inside the reel body 141 to be rotatable about a sixth axis O6, and around which a fishing line, not shown, is wound.

In the present embodiment, the dual-bearing reel 140 with a so-called low-profile will be described as an example, but the dual-bearing reel may be a so-called round type as well.

The fifth axis O5 and the sixth axis O6 are essentially parallel to each other. In the present embodiment, the direction along the fifth axis O5 and the sixth axis O6 is defined as the left-right direction L1, and a direction intersecting the fifth axis O5 and the sixth axis O6 essentially orthogonally in a plan view, as shown in FIG. 14, is defined as the front-rear direction L2. Additionally, the direction in which the fishing line is (cast) unreeled from the spool 143 in the front-rear direction L2 is defined as the front, the opposite direction thereto is defined as the rear, and left and right are defined according to the point of view of the dual-bearing reel 140 as seen from the rear side. Furthermore, of a vertical direction that is essentially orthogonal to the left-right direction L1 and the front-rear direction L2, the direction in which an operation surface 154a of a clutch lever 154, which is described below, is oriented is referred to as upward, and the opposite direction is referred to as downward.

The reel body 141 primarily comprises a body portion 150 (body portion), a front cover portion 151 that covers the front of the body portion 150, and a thumb rest portion 152 that covers the upper portion side of the body portion 150. A mounting portion body (not shown), which is mounted on a fishing rod (not shown) is attached to the lower portion of the body portion 150. The above-described spool 143, a level winding mechanism (not shown) for uniformly winding a fishing line around the spool 143, and an rotation transmission mechanism (not shown) that transmits the rotational force of the handle assembly 142 to the spool 143 are disposed within the body portion 150

The rotation transmission mechanism primarily comprises a clutch mechanism (not shown) that switches between a transmitting state in which the rotational force of the handle assembly 142 is transmitted to the spool 143 and a cutoff state in which said transmission is cut off (that is, switching between ON and OFF), and a drag mechanism, which is not shown.

A star drag 153 for adjusting the drag is disposed on the right side of the reel body 141, and a clutch lever 154 for operating the clutch mechanism between ON and OFF is disposed on the rear portion side of the reel body 141, such that an operation surface 154a can be pressed downward when facing up.

The handle assembly 142 comprises a handle shaft 30 that is disposed inside the body portion 150 of the reel body 141 and that is supported to be rotatable about the fifth axis O5, a handle arm (operation body) 160 that is non-rotatably connected to the handle shaft 30 and that is mounted to be rotatable about the fifth axis O5 with respect to the reel body 141 via the handle shaft 30, a pair of knob shafts 32 that are respectively fixed to distal end portions 160a on both sides of the handle arm 160, and a pair of handle knobs 33 that are respectively rotatably mounted to the pair of knob shafts 32.

The handle shaft 30 is configured to transmit rotational force to the rotation transmission mechanism. The handle arm 160 is a plate shape that extends in the radial direction of the handle shaft 30, and a central portion 160b thereof is non-rotatably connected to the distal end portion of the handle shaft 30. Then, as described above, the knob shafts 32 and the handle knobs 33 are respectively disposed on the distal end portions 160a on both sides of the handle arm 160. Thus, the handle assembly 142 according to the present embodiment is configured to be a so-called double handle type handle assembly.

The configurations of the knob shafts 32 and the handle knobs 33 are the same as those of the first embodiment. Accordingly, detailed descriptions of the knob shaft 32 and the handle knob 33 have been omitted.

The same action and effects as those of the first embodiment can be achieved with the dual-bearing reel 140 of the present embodiment configured in the manner described above. That is, it is possible to provide a handle knob 33 that can be mounted on a knob shaft 32 with little or no rattling while preventing deterioration of the fitting and gripping properties, and with which a stable handle operability can be realized, as well as a dual-bearing reel 140.

While embodiments of the present invention have been described, these embodiments have been presented by way of example only, and are not intended to limit the scope of the invention. The embodiments may be implemented in a variety of other forms; furthermore, various omissions, substitutions and changes may be made without departing from the essence of the invention. Embodiments and modified examples thereof include those that can be easily conceived of by a person skilled in the art, those that are essentially the same, and those that have equivalent scope.

For example, in each of the embodiments above, two first through-holes 108 and second through-holes 109 are formed at intervals in the circumferential direction, but there may be only one, or there may be three or more. When forming three or more first through-holes 108 and second through-holes 109, it is preferable to use an even number, so that the through-holes can be arranged to face each other in the radial direction across the third axis O3.

For example, it is preferable to form four first through-holes 108 and second through-holes 109 at equal intervals in the circumferential direction (that is, forming four at 90-degree intervals centered about the third axis O3) and to arrange the through-holes to face each other in the radial direction. With such a configuration, it is possible to form four first insertion portions 115 and second insertion portions 116 to combine the outer knob 110 with the inner knob 100 in a more reliably positioned state and to press against the outer ring 124 of the first bearing 121 and the outer ring 124 of the second bearing 122 from the radially outward side at four locations, thereby more effectively suppressing rattling.

Additionally, in the embodiments described above, the first insertion portion 115 and the second insertion portion 116 protrude farther along the third axis O3 side than the first outer ring bearing surface 103 and the second outer ring bearing surface 104 in order to press against the outer ring 124 of the first bearing 121 and the outer ring 124 of the second bearing 122; however, it is not necessary for the outer rings 124 to be pressed. That is, it is sufficient as long as the first insertion portion 115 and the second insertion portion 116 are at least inserted inside the first through-hole 108 and the second through-hole 109.

What is claimed is:

1. A handle knob for a fishing reel mounted on a knob shaft and rotatable about an axis of the knob shaft, and being fixed to an operation body rotatably combined with a reel body of a fishing reel, comprising:
    an inner knob having a tubular shape surrounding the knob shaft from a radially outward side;
    an outer knob formed from resin and surrounding at least a portion of the inner knob from the radially outward side and being integrally formed with the inner knob; and
    a bearing having an inner ring fitted to an outer surface of the knob shaft and an outer ring fitted to an inner surface of the inner knob, and rotatably supporting the inner knob on the knob shaft about the axis,
    the inner knob including a bearing surface which contacts with the outer ring, and
    the bearing surface including a through-hole which through an insertion portion of the outer knob is configured to be inserted in a radial direction.

2. The handle knob for a fishing reel according to claim 1, wherein
    the insertion portion of the outer knob protrudes farther than the bearing surface in the radial direction and presses the outer ring from the radially outward side.

3. The handle knob for a fishing reel according to claim 1, wherein
    the through-hole in the bearing surface is one of a plurality of through-holes which are formed at intervals in a circumferential direction about the axis.

4. The handle knob for a fishing reel according to claim 3, wherein
    the plurality of through-holes are arranged to face each other in the radial direction across the axis.

5. The handle knob for a fishing reel according to claim 1, wherein
    the inner knob further includes a guide surface formed on an outer surface of the inner knob along an outer peripheral edge of the through-hole, the guide surface extending toward from an outer surface side toward an inner surface side of the inner knob.

6. The handle knob for a fishing reel according to claim 1, wherein
    the outer knob is made with an elastomer resin.

7. A fishing reel, comprising:
    a reel body;
    a handle shaft rotatably supported on the reel body; and
    the handle knob for a fishing reel according to claim 1,
    the operation body being a handle arm non-rotatably connected to the handle shaft and to a distal end portion of which the knob shaft is non-rotatably connected, and
    the handle knob being mounted on the distal end portion of the handle arm via the knob shaft.

* * * * *